| United States Patent [19] | [11] 3,993,636 |
|---|---|
| Maubois et al. | [45] Nov. 23, 1976 |

[54] ULTRAFILTRATION PROCESS FOR OBTAINING PROTEIN ISOLATES OF VEGETABLE ORIGIN

[75] Inventors: Jean-Louis Joseph Maubois, Pace; Joseph Culioli, Le Rheu; Alain Chopin; Marie-Christine Chopin, both of Rennes, all of France

[73] Assignee: Institut National de la Recherche Agronomique, Paris, France

[22] Filed: Sept. 13, 1974

[21] Appl. No.: 505,912

[30] Foreign Application Priority Data
Sept. 14, 1973 France .............................. 73.33123

[52] U.S. Cl. ............................................ 260/123.5
[51] Int. Cl.² .......................................... A23J 1/14
[58] Field of Search .................................. 260/123.5

[56] References Cited
UNITED STATES PATENTS

| 3,586,662 | 6/1971 | O'Connor ........................ 260/123.5 |
| 3,622,556 | 11/1971 | O'Connor ........................ 260/123.5 |
| 3,736,147 | 5/1973 | Iacobucci et al. ........... 260/112 R X |

*Primary Examiner*—Howard E. Schain
*Attorney, Agent, or Firm*—Oblon, Fisher, Spivak, McClelland & Maier

[57] ABSTRACT

An easily extrudable protein can be obtained from a vegetable source, such as sunflowers, by treating an alkaline solution of the protein obtained from said source, to ultrafiltration, through a semi-permeable membrane, having a pore size of 0.1 to 30 m$\mu$, and adding a wash liquid to said solution while continuing said ultrafiltration.

10 Claims, No Drawings

ULTRAFILTRATION PROCESS FOR OBTAINING PROTEIN ISOLATES OF VEGETABLE ORIGIN

BACKGROUND OF THE INVENTION

1. Field of the Invention

This invention relates generally to a process for obtaining protein isolates from sunflower and colza.

2. Description of the Prior Art

New sources of protein are now being sought, owing both to the extensive malnutrition existing in more than half the world population, and also owing to the elevation of feeding habits in the industrialized countries.

Many new sources of proteins have been studied in recent years, and particularly proteins derived from plants, such as seaweeds, bacteria, yeasts, and oleaginous seeds. Notably sunflower, colza and cotton are considered to be excellent sources of protein, both because they are in abundant supply, and, except for cotton, have relatively little other commercial value.

Processes are already known for obtaining proteins from sunflowers. For instance, one such process known as the precipitation-washing technique, is described by Gheyasuddin, Cater and Mattil in Food Technology 24-242 (1970), but, of course, other similar processes are known.

In general, these prior art processes comprise the following essential steps:

a. alkaline solubilization of the protein contained in the sunflower meal with a sodium hydroxide solution containing sodium sulphite;

b. clarification of the suspension so obtained by centrifugation or decantation, thus permitting the alkaline protein solution to be separated from the solid residue which is essentially comprised of cellulose and hemicellulose c. precipitation of the protein contained in the alkaline solution by acidification at the isoelectric point, i.e. that point corresponding to the pH at which solubilization of the sunflower proteins is minimal and d. purification of the protein in an insoluble form obtained in the preceding step by washing with water, followed by centrifugation or filtration, then washing with alcohol and ether The isolated proteins are dried, often by freeze-drying or spray-drying, and recovered.

These processes do not require complex apparatus, but, on the other hand do necessitate the use of large amounts of water and solvents. This implies the potential for substantial pollution problems for any firm using this process. Furthermore, some significant amounts of sunflower protein will invariably be lost in the washing water, or precipitate, obtained in step (c) due to the high solubility of some of the proteins at the process pH. Another difficulty with those processes is that they require substantial purification procedures and even then, the obtained isolates are dark colored and have been shown to be unsuited for extrusion due to the presence of mucilaginous substances which, in concentrated alkaline solutions, tend to block the extrusion nozzles.

It would be desirable therefor to provide a process whereby proteins can be isolated from such vegetative sources, whereby the isolated proteins can be provided in a purified and concentrated form, without the use of large amounts of solvents which can pose potential environmental pollution difficulties.

Protein extraction methods are also known which make use of reverse osmosis or ultrafiltration techniques.

Thus, the O'Connor reference U.S. Pat. No. 3,622,556 refers to the isolation of protein from sunflower meal, whereby the vegetable product obtained from sunflower seeds is alkali extracted, the phases separated from the extraction and the alkaline phase subjected to ultrafiltration through a semipermeable membrane having a pore diameter in the range of 10 to 80 A under a pressure ranging from 0.7 to 7 kg/cm².

The process is effected in an inert atmosphere. Following ultrafiltration, the retentate is recovered. It was found that the recovered protein is essentially free of those substances which are likely to impart an undesirable color.

One disadvantage of that process, however, is that it requires a substantial portion of the procedure to be carried out in an inert atmosphere during extraction and separation of the phases. Moreover, O'Connor is incapable of obtaining protein isolates having at once a high dry matter content, a high nitrogenous matter content and a very low level of impurities.

As a matter of fact the removing of coloured impurities in protein fractions extracted from sunflower and colza raises difficult problems, which do not set with the same acuteness in the case of soya.

SUMMARY OF THE INVENTION

Accordingly, it is one object of this invention to provide a process whereby a concentrated liquid ultrafiltration retentate can be obtained which contains a protein capable of being subjected to subsequent extrusion or drawing operations without special treatment, for the manufacture of textured products.

Another object of the invention is to provide a process for obtaining products which can be used directly in human or animal feeds.

Another object of this invention is to provide a process which allows the removing of coloured impurities in protein fractions extracted from sunflower and colza without the necessity of the use of complex and onerous techniques, such as working under an inert atmosphere.

These and other objects of this invention, as will hereafter become better understood by the following description have been attained by subjecting a vegetable protein source, such as sunflower or colza seeds, to a temperature of 2–30° C in an aqueous alkaline solution of the finely ground seeds, flower or meal of the plant;

Subjecting said solution to ultrafiltration through a semipermeable membrane having a pore diameter of from 0.1 to 30 m$\mu$, wherein ultrafiltration is continued until the nitrogeneous matter content (N × 6.25) of the retentate is in the range of 3 to 12% by weight of the retentate;

Adding to the retentate, while containing ultrafiltration, a washing liquid in a quantity such that when the volume of solution passing through the membrane is equal to the quantity of liquid added, the concentration of nitrogenous matter (N × 6.25) in the retentate will be 70 to 85% of the total dry matter of the retentate;

adjusting the temperature of the retentate to a value of between 20° to 60° C and continuing ultrafiltration until the nitrogeneous matter (N × 6.25) is about 85 to 95% by weight of the total dry matter.

The retentate can thereafter be isolated, such as by freeze-drying or spray-drying, or it may be frozen at a temperature of −20° to −80° C, or it may be used per se without further treatment.

DETAILED DESCRIPTION OF PREFERRED EMBODIMENTS

The vegetable source, i.e. sunflower or colza, may be used in the form of seeds, flower or meal, although meal is preferred. The source is suspended in an alkaline solution, and the temperature adjusted to between 20°–50° C, most preferably about 40° C. The suspension may optionally contain sodium sulfrite or some other source of sulfur dioxide. Good results are attained with the use of 8 to to 12 times the amount of alkaline solution, preferably 10 times the weight of the meal. The alkalinity of the solution is adjusted to a pH of 8 to 12, and preferably 10.5 to 11.0

The suspension is then permitted to macerate for 20 to 60 minutes, and most desirably about 30 minutes, and the insoluble residue is separated by known means from the mixture, to form a clarified alkaline solution. The clarified alkaline solution is passed over a semipermeable membrane having a pore diameter in the range of 0.1 m$\mu$ and 30 m$\mu$ and preferably between 1 and 20 m$\mu$ at a temperature in the range of 2° and 30° C. The pressure of the liquid entering the ultrafiltration module is in the range of 1 to 50 kg/cm$^2$, and the velocity of the liquid at right angles to the membrane is adjusted to as high a value as possible, for instance 1 to 2 meters/second. The ultrafiltration procedure is repeated until the nitrogeneous matter content (N × 6.25) of the retentate is in the range of 3 to 12%, preferably between 5 and 8% by weight of the retentate.

A volume of alkaline extraction solution having a pH identical to that of the retentate is added to the retentate at a temperature in the range of 2° C to 30° C, so that, when the volume of the permeated liquid, which has passed through the membrane, is equal to the added volume, the concentration of nitrogenous matter (N × 6.25) in the retentate is 70 to 85% of the total dry matter. The temperature of the retentate so washed is then raised to a value ranging from 20° to 60° C, and preferably between 40 and 45° C, and ultrafiltration is continued until the nitrogenous matter (N × 6.25) constitutes 85 to 95% (by weight) of the total dry matter.

The final retentate may thereafter be isolated, such as by freeze-drying of spray-drying, or may be frozen at a temperature of between −20° to −80° C, alternatively, the final retentate may be used per se without further processing.

The protein solution (having a dry matter content of 15 to 25%) obtained according to the process of the present invention has been found to have a level of impurities of at least lower than 5%, with a nitrogenous matter content of at least 15%.

The viscosity of the solution will be at least equal to 10 poises, under the following conditions when prepared from sunflower meal:

temperature 5° C
velocity gradient 3 sec.$^{-1}$
shear rate 25 dynes/cm$^2$

Owing to these physico-chemical properties, the proteins obtained can be subjected directly to extruding operations without subsequent treatment.

The alkaline solution used to suspend the vegetable protein source is sodium or potassium hydroxide solution, for example from 0.1 to 10 g/l in an amount such that the pH of the resulting suspension is in the range of 8 to 12, and preferably between 10.5 and 11.0. A 4g/l solution of caustic soda can be used for example.

0.5 to 0.10% by weight sodium sulphite is generally added to the resulting alkaline solution to maintain the pigments present in the sunflower or colza meal in a reduced form.

According to one variant of the process of the invention, the vegetable protein source is put in an aqueous sodium sulphite solution at a temperature in the range of 20° to 50° C, and preferably 40° C, and the pH of said suspension is adjusted to a value ranging from 8 to 12, and preferably from 10.5 to 11.0, by the addition of a concentrated sodium hydroxide solution.

The insoluble residue is separated from the alkaline protein solution, by decantation-centrifugation, for example.

In the process of the present invention, semipermeable membranes are used having pore diameters in the range of 0.1 to 30 m$\mu$, and preferably between 1 and 20 m$\mu$, which are resistant both to alkaline solutions, that is to say, solutions having a pH in the range of 8 to 12, and to the process temperatures and conditions.

The nature of the membranes used for the embodiment of the present process is a function of the operating conditions, notably the pH, the desired molecular separation and the temperatures employed. For example, to treat a pH 10 protein solution, cellulose acetate membranes whose characteristics are impaired below pH 3 and above pH 8 could not be used. Good results are obtained with the use of membranes prepared from such synthetic polymers as polyamide, polyolefin, polyvinyl chloride, polyacrylonitrile, or the like, or by any other material which is durable and resistant under the pH conditions.

Similarly, according to the desired molecular separation (size of the protein molecules to be concentrated and purified and size of the molecules to be removed), membranes having a well defined "cut-off" may be used. In the process of this invention, membranes having a cut-off in the range of 2,000 and 30,000 may be advantageously used.

More particularly, especially suitable semipermeable membranes which may be used are those known of the trade names IRIS 3069, IRIS 3042, made by Rhone Poulenc (France), DIAFLO PM 30, DIAFLO XM 50 and DIAFLO UM 20 E made by Amicon (USA) and DDS AR6 made by DDS (Denmark).

"Diaflo" membranes are described by AMICON & Co. (Publication No. 426). Rhone-poulenc & Co, (France) in "Ultrafiltration" defines other types of membranes which are suited to the requirements of the invention.

Contacting a volume $V_1$ of the clarified, alkaline, protein source solution with a semipermeable membrane results in two liquids being obtained: a first liquid passing through the membrane and called the "permeate", the composition of which is similar to that of the solution contacted, except that the said permeate does not contain protein, and a second liquid, which does not pass through the membrane, called the "retentate", whose composition is similar to that of the solution contacted with the said membrane except that the said retentate has a protein content expressed in (N × 6.25) higher than the protein content of the initial alkaline solution.

Washing of the retentate remaining in the ultrafiltration circuit after one or more filtration steps is carried out with a volume ($V_3$) of water or an alkaline solution having a pH identical to that of the retentate.

Advantageously, the same alkaline solution may be used for the washing step as for the first suspension of the protein source. Volume $V_3$ is, as was said above, such that when the volume of liquid which has passed through the membrane is equal to said value $V_3$, the concentration of nitrogenous matter (N × 6.25) in the retentate is 70 to 85% of the total dry matter. It has been found that said concentration is generally reached when volume $V_3$ is equal to volume $V_1$ of the initial alkaline solution contacted with the said membrane, and when the said volume $V_3$ of alkaline extraction solution is added at a flow rate similar or equal to the flow rate of the liquid passing through the membrane.

Concentration of the retentate so obtained is continued at a temperature in the range of 20° to 60° C. In general, it has been found that the final volume of the liquid which does not pass through the membrane is between 1/5th and 1/10th of volume $V_1$. The dry matter content of said liquid has a value in the range of 12 to 30g per 100.

Furthermore, it is possible to precipitate the proteins obtained by adjusting the pH of the final retentate to a value substantially equal to the isoelectric pH (pH 4.6) of the proteins, and wash and dry said protein precipitate by freeze-drying or spray-drying.

This other variant of the invention makes it possible to obtain extremely pure proteins, the ratio N × 6.25 to the total dry matter being equal to or higher than 0.95.

This process can be used for the treatment of colza, sunflower seeds, flour or meal.

Having generally described the invention, a more complete understanding can be obtained by reference to certain specific examples, which are included for purposes of illustration only and are not intended to be limiting unless otherwise specified.

EXAMPLE I

In this example, 1 kg of commercial sunflower meal having the following composition was used:
  dry matter content: 91.5g per 100
  nitrogenous matter content (N × 6.25): 33.5 g per 100

Said meal was suspended in 10 kg water containing 50 g sodium sulphite the temperature of which had previously been raised to 40° C.

The suspension was maintained for 30 minutes while stirring at a temperature of 40° C, the pH of the solution constantly being adjusted to the value 10.5 by the addition of a 10 N sodium hydroxide solution.

Said solution was clarified by centrifugation at 2000 xg then filtered on fritted glass of porosity n° 2 to obtain 7.7 kg of a solution having the following composition:
  dry matter content: 4.61g p. 100
  nitrogenous matter content (N × 6.25): 2.64 g p. 100
    the temperature of which was adjusted to 9° C and was contacted with an "AMICON" type "PM 30" membrane in an "AMICON" type "Hollow Fiber 1" apparatus.

The operation was continued until the volume of the retentate represented half the volume of the initial solution. 7.7kg water was then added to the retentate at a flow rate identical to the flow rate of the permeate. After exhaustion of the 7.7kg water, the temperature of the retentate was raised to 30° C and the retentate was concentrated by contact with the membrane until its volume was 1/7th of the volume of the initial solution.

1. 1kg retentate of the following composition:
   dry matter content: 21.2 p. 100
   nitrogenous matter content: 18.3g p. 100
     was rapidly frozen in a carbonic ice — acetone mixture (temperature −80° C)

The product obtained after thawing and adjusting the dry matter content to 15g p. 100 and the pH value to 11.5 successively underwent extruding operations.

EXAMPLE II

A 400g amount of sunflower meal obtained after de-oiling dehulled sunflower seeds having the following composition was used:
  dry matter content: 92.9%
  nitrogenous matter content (N × 6.25): 46.7%

Said 400g of meal was suspended in 4kg of water containing 20g sodium sulphite, the temperature of said solution having been previously raised to 40° C.

The suspension was maintained at 40° C with stirring for 30 minutes, the pH of the solution was constantly adjusted to a value of 10 by addition of a concentrated 10 N sodium hydroxide solution.

The suspension was clarified by centrifugation at 200 xg. The liquid floating on the surface after filtration on a fritted glass No. 2 had the following composition:
  dry matter content (in weight) 5.67%
  nitrogenous matter content (N × 6.25) 3.31%

The temperature of 3.3kg of the clarified and filtered solution previously obtained was then lowered to 6° C and said solution was contacted with an "AMICON" "PM 30" membrane in an "AMICON" "Hollow Fiber HUX 1" apparatus.

The liquid entered the module at a pressure of 1kg/cm, the velocity of the liquid at right angles to the membrane being 1 meter/second.

4.95kg was added simultaneously to said solution at a flow rate identical to the flow rate of the permeate.

After 4.95 kg of permeate had flowed through the membrane the composition was as follows:
  dry matter content 0.97 g per 100
  nitrogen content (N × 6.25) 0.013g per 100

The retentate, having a nitrogenous matter content representing 79% of the dry matter was concentrated by contact with the membrane at a temperature of 9° C until the volume of the retentate was half the volume of the initial solution.

The temperature of the retentate was then raised to 30° C and concentration was continued until the volume of the retentate was about 1/5th of the volume of the initial solution.

During the concentration step the composition of the permeate was as follows:
  dry matter content 0.7g per 100
  nitrogen content 0.016g per 100

The retentate obtained at the end of concentration had the following composition:
  dry matter content 16.6g per 100
  nitrogenous matter content (N × 6.25) 15.1g per 100

Part of said retentate was freeze dried.

The composition of the proteins obtained was as follows;
  dry matter content 96.6g per 100
  nitrogenous matter content 86.9g per 100

The pH of the other part of the solution was adjusted to a value of 4.8 by the addition of hydrochloric acid N;

the proteins precipitated at this pH were washed with water and freeze dried.

Their composition was as follows:
dry matter content 96.6g per 100
nitrogenous matter content (N × 6.25) 94.3 g per 100.

This example shows that the process of the invention makes it possible to obtain protein isolates containing about 97% by weight of nitrogenous matter (N × 6.25).

EXAMPLE III 1,200 g of colza meal, "Primor species" having the following composition were used:

| | |
|---|---|
| dry matter content | 91.0 g per 100 |
| nitrogenous matter content (N × 6.25) | 37.5 g per 100 |
| ratio of (N × 6.25) content to dry matter content | 0.41 |
| lipid content | 0.7 g per 100 |

These 1,200 g of meal were put in suspension into 12 kg of water at the temperature of 20° C. The pH of the suspension was adjusted to 9.0 by addition of a concentrated solution of sodium hydroxide (10 N).

The temperature of the so obtained solution was raised to 40° C and maintained for 30 minutes with stirring. The solution was then clarified by centrifugation at 1,500g.

The composition of the supernatent liquid was as follows:

| | |
|---|---|
| dry matter content | 4.05 g per 100 |
| nitrogenous matter content (N × 6.25) | 1.78 g per 100 |
| ratio of (N × 6.25) content to dry matter content | 0.44 |

8 kg of the clarified solution was brought into contact with an "AMICON" membrane type "XM 50" in an "AMICON" module type "HOLLOW FIBER" at the temperature of 20° C.

The liquid entered the said module at a pressure of 1 kg/cm², the velocity of the liquid near the membrane being 1 m/s.

The ultrafiltration was carried on until the retentate was about ¼th of the volume of the initial solution.

8 kg of water were then added to this solution at a flow rate identical to the flow rate of the permeate. The concentration of the retentate was carried on by ultrafiltration until its volume was 1/6th of the volume of the initial solution.

The recovered total permeate had the following

| composition: | |
|---|---|
| dry matter content | 1.15 g per 100 |
| content of non-proteinic nitrogen matter soluble in trichloracetic acid (12%) | 0.031 g per 100 |

The composition of the retentate at the end of the ultrafiltration was as follows:

| | |
|---|---|
| dry matter content | 11.4 g per 100 |
| nitrogenous matter content | 8.7 g per 100 |

This example shows that it is possible to obtain by ultrafiltration on membrane according to this invention, retentates of colza proteins having a ratio of (N × 6.25) content to dry matter content of 0.76.

We claim:

1. A process for obtaining a purified and concentrated isolate of a vegetable source which comprises
    dissolving the ground seeds, flour or meal from sunflower or colza in an alkaline solution, thereby forming an alkaline protein solution;
    subjecting said solution to ultrafiltration with a semipermeable membrane having a pore diameter of 0.1 to 30 mµ at a temperature of 2°–30° C, to form a retentate having an amount of nitrogenous matter (N × 6.25) in the range of 3 to 12% by weight of the retentate;
    adding to said retentate a volume of wash liquid while continuing ultrafiltration at a temperature of 2°–30° C, such that when the volume of the permeate is equal to said added volume, the concentration of nitrogenous matter (N × 6.25) in the retentate will be 70 to 85% by weight of the dry matter of said retentate;
    adjusting the temperature of said retentate to 20°–60° C and continuing said ultrafiltration procedure; and
    thereafter recovering said concentrated and purified retentate.

2. The process of claim 1, wherein wash liquid used is water, or an alkaline extraction solution having a pH substantially the same as that of the retentate.

3. The process of claim 1 wherein said wash liquid water is added immediately after contacting the alkaline protein solution with the semipermeable membrane.

4. A process of claim 1 wherein said vegetable protein source is sunflower meal which is prepared by the process which comprises:
    a. suspending a ground sunflower meal at a temperature of from 20° to 50° C, in an alkaline solution, the amount of alkaline solution used being 8 to 12 times the weight of the meal, the alkalinity of the said solution being such that the pH of the resulting mixture is between 8 and 12;
    b. permitting the mixture obtained in (a) to macerate while stirring for 20 to 60 minutes, removing the insoluble residue to form a clarified alkaline solution;
    c. contacting the clarified alkaline solution with a semipermeable membrane at a temperature in the range of 2° to 30° C, the pore diameter of said membrane being in the range of 0.1 to 30 mµ, the liquid entering the ultrafiltration module being at a pressure in the range of 1 to 50 kg/cm²;
    d. repeating step (c) until the level of nitrogenous matter (N × 6.25) in said retentate is in the range of 3 to 12%;
    e. continuing ultrafiltration at a temperature in the range of 2° to 30° C, and adding a volume of water or alkaline solution having a pH substantially the same as that of the retentate, whereby when the volume of liquid which has passed through said membrane is equal to said added volume, the concentration of nitrogenous matter (N × 6.25) in the retentate amounts to 70 to 85% of the total dry matter;
    f. continuing ultrafiltration of said retentate at a temperature in the range of 20° to 60° C, using the said semipermeable membrane until the concentration of nitrogenous matter in the final retentate is between 85 to 95% of the total dry matter.

5. The process of claim 4, wherein the sunflower meal is suspended in an aqueous sodium sulphite containing solution and wherein during step (b) the pH is adjusted by the use of an alkaline solution to a value of between 8 and 12.

6. The process of claim 5, wherein a sodium or potassium hydroxide solution having a concentration in the range of 0.1 to 10g/l, is used as the alkaline solution.

7. The process of claim 1, wherein said semipermeable membrane has a pore diameter in the range of 0.1 to 30m$\mu$, and a cut-off in the range of 2,000 to 30,000.

8. The process of claim 1, wherein the liquid is passed at right angles to the membrane at a velocity of about 1 meter/second, and wherein the solution entering the ultrafiltration module is at a pressure in the range of 1 to 50kg/cm$^2$.

9. The process of claim 1, wherein the final retentate is, further, dried by freeze-drying or spray-drying or frozen at between −20° C to −80° C.

10. The process of claim 1, wherein the proteins of vegetable origin are isolated in their insoluble form by precipitation, adjusting the pH of the final retentate to the isoelectric pH of the protein, after which the proteins so precipitated are washed and dried.

* * * * *